(12) United States Patent
Vajo et al.

(10) Patent No.: US 11,472,699 B1
(45) Date of Patent: Oct. 18, 2022

(54) LITHIUM ALUMINUM HYDRIDE COMPOSITION FOR HYDROGEN STORAGE AND GENERATION

(71) Applicant: HRL LABORATORIES, LLC, Malibu, CA (US)

(72) Inventors: John J. Vajo, West Hills, CA (US); Jason A. Graetz, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 799 days.

(21) Appl. No.: 16/206,829

(22) Filed: Nov. 30, 2018

Related U.S. Application Data

(60) Provisional application No. 62/622,681, filed on Jan. 26, 2018.

(51) Int. Cl.
  *C01B 3/26* (2006.01)
  *C01B 3/06* (2006.01)
  *C01B 3/00* (2006.01)

(52) U.S. Cl.
  CPC ............ *C01B 3/065* (2013.01); *C01B 3/0026* (2013.01); *C01B 3/0078* (2013.01)

(58) Field of Classification Search
  CPC ...... C01B 3/065; C01B 3/0078; C01B 3/0026
  See application file for complete search history.

(56) References Cited

PUBLICATIONS

Amama et al., J. Phys. Chem., (2012), v.116, p. 21886-21894.*
Xiangfeng Liu et al., "Facile Cycling of Ti-Doped LiAlH$_4$ for High Performance Hydrogen Storage", *J. American Chemical Society*, vol. 131, No. 14, 2009, pp. 5032-5033.
Shu-Sheng Liu et al., "Effect of ball milling time on the hydrogen storage properties of TiF$_3$-doped LiAlH$_4$", *International Journal of Hydrogen Energy*, vol. 34 (2009) pp. 8079-8085.
M. Ismail et al., "Effects of NbF$_5$ addition on the hydrogen storage properties of LiAlH$_4$", *International Journal of Hydrogen Energy*, vol. 35 (2010) pp. 2361-2367.
D. Blanchard et al., Isothermal decomposition of LiAlD4 with and without additives, Journal of Alloys and Compounds, 2005, pp. 743-747, vol. 404-406, Elsevier B.V.
V.P. Balema et al., Titanium catalyzed solid-state transformations in LiAlH4 during high-energy ball-milling, Journal of Alloys and Compounds, 2001, pp. 108-114, Vo. 329, Elsevier Science B.V.

* cited by examiner

*Primary Examiner* — Yong L Chu
(74) *Attorney, Agent, or Firm* — Lewis Roca Rothgerber Christie LLP

(57) ABSTRACT

A composition for hydrogen (H$_2$) storage and generation including lithium aluminum hydride (LAlN) is provided. The composition includes a mixture of LiAlH$_4$ and a catalytic metal additive designed to tailor the kinetics of hydrogen release. The LiAlH$_4$ and catalytic metal additive and are gently mixed together in order to physically disperse the LiAlH$_4$ and catalyst powders without causing a detrimental chemical interaction. The hydrogen capacity of the composition is substantially not reduced or decreased (e.g., undergoes less than about 5% reduction) during the mixing process.

15 Claims, 5 Drawing Sheets

LITHIUM ALUMINUM HYDRIDE COMPOSITION FOR HYDROGEN STORAGE AND GENERATION

CROSS-REFERENCE TO RELATED APPLICATION

This application claims priority to and the benefit of U.S. Provisional Application No. 62/622,681, filed Jan. 26, 2018 and titled "LITHIUM ALUMINUM HYDRIDE COMPOSITION FOR HYDROGEN GENERATION", the entire content of which is incorporated herein by reference.

FIELD

The present disclosure relates generally to hydrogen storage and generation, and more specifically to a composition including lithium aluminum hydride (also called lithium alanate, $LiAlH_4$) for hydrogen generation.

BACKGROUND

The use of hydrogen ($H_2$) as an energy storage medium has received increased attention as concerns about carbon dioxide ($CO_2$) emissions have grown. In particular, $H_2$ produces only water ($H_2O$) upon combustion or electrolysis, and does not directly produce $CO_2$ at the time of energy use.

The use of pure $H_2$ (e.g., in gaseous or liquid form) as an energy storage medium entails several logistical and safety challenges associated with storage and transport of the material. For example, $H_2$ has a relatively low energy density when provided as a gas. This limitation may be overcome using solid state hydrogen complexes. Hydrogen stored in the solid state (e.g., as a metal hydride) may have an energy density that is approximately three orders of magnitude greater than gaseous hydrogen under standard conditions, and at least twice as large as compressed gas or liquid hydrogen. The high volumetric hydrogen capacity of hydride complexes is particularly attractive. However, other properties, including the specific energy (gravimetric hydrogen capacity) and temperature of hydrogen release, must also be optimized for metal hydrides to serve as a suitable storage medium. Lithium aluminum hydride (LAIN has been proposed as a solid state hydrogen storage medium because a relatively high weight percent of the compound can provide hydrogen, compared to other storage materials available in the art.

When a hydrogen storage medium provides $H_2$ by way of one or more chemical reactions (as opposed to e.g., a pure $H_2$ molecule de-adsorption process), catalysts or additives are often added to the material to control the rates of those reactions. As such, the material's $H_2$ release properties can be tuned with respect to onset temperature, release rates, and/or release profile with respect to time and temperature. However, hydrogen storage compositions including such catalysts are often shown to suffer from capacity decreases and $H_2$ loss during preparation, decreasing the available weight percent of hydrogen in the composition. In some cases, the capacity decrease is permanent and cannot be recovered by subsequent hydrogenation. The decrease is thought to be due to unwanted chemical interactions that occur between the storage medium and catalyst during the mixing process. As such, the use of $LiAlH_4$ in hydrogen storage materials has been limited.

SUMMARY

Aspects of embodiments of the present disclosure provide a composition for hydrogen storage and $H_2$ generation including: lithium aluminum hydride (LAIN; a catalytic metal additive Mk that is evenly physically dispersed in the $LiAlH_4$ (where M is a z+ valent metal and A is a univalent anion); and a lithium compound LiA of a stoichiometric reaction of the catalytic metal additive Mk with the $LiAlH_4$, in an amount of less than 0.5·z·x mole fraction. The catalytic metal additive Mk is included in an amount of x mole fraction of $LiAlH_4$, with x being less than about 0.1. The composition has a hydrogen capacity of greater than or equal to about 7.1 wt % with respect to the original amount of $LiAlH_4$.

In some embodiments, the mole fraction of $LiAlH_4$ may be 0.005≤x≤0.1. In some embodiments, the mole fraction of $LiAlH_4$ may be 0.03≤x≤0.05.

In some embodiments, the catalytic metal additive $MA_z$ may be $TiCl_3$ and/or $TiF_3$.

In some embodiments, the lithium compound LiA may be LiCl and/or LiF.

In some embodiments, the lithium compound LiA may be included in an amount less than 0.3·z·x mole fraction.

In some embodiments, samples taken from different parts of the composition in an amount of about 0.1 wt % to about 5 wt % may have a compositional variation of less than or equal to about 25%.

In some embodiments, the composition may have a hydrogen release onset temperature of about 90° C. to about 140° C.

Aspects of embodiments of the present disclosure provide a hydrogen storage device comprising the composition for hydrogen storage and $H_2$ generation.

Aspects of embodiments of the present disclosure provide a method of preparing a composition for hydrogen storage and generation, including: dispersing a catalytic metal additive $MA_z$ in lithium aluminum hydride ($LiAlH_4$) so that the catalytic metal additive $MA_z$ is evenly physically dispersed in the $LiAlH_4$ and a stoichiometric reaction between the $LiAlH_4$ and the catalytic metal additive $MA_z$ to produce a lithium compound LiA proceeds to less than about 50% of completion, where M is a z+ valent metal and A is a univalent anion; and the catalytic metal additive $MA_z$ is included in an amount of x mole fraction of $LiAlH_4$, x being less than about 0.1.

In some embodiments, dispersing $LiAlH_4$ and the catalytic metal additive $MA_z$ may include shaking about 1 to about 10 g of the $LiAlH_4$ and the catalytic metal additive $MA_z$ for about 1 minute to about 10 minutes at a frequency of less than about 10 Hz in a closed container without additional media.

In some embodiments, dispersing $LiAlH_4$ and the catalytic metal additive $MA_z$ may include shaking up to about 50 g (e.g., about 1 g to about 50 g) of the $LiAlH_4$ and the catalytic metal additive $MA_z$ for about 8 minutes to about 20 minutes at a frequency of less than about 10 Hz in a closed container without additional media.

In some embodiments, the stoichiometric reaction between the $LiAlH_4$ and the catalytic metal additive $MA_z$ may proceed to less than about 30% of completion.

In some embodiments, the mole fraction of $LiAlH_4$ may be 0.005≤x≤0.1. In some embodiments, the mole fraction of $LiAlH_4$ may be 0.03≤x≤0.05.

In some embodiments, samples taken from different parts of the composition in an amount of about 0.1 wt % to about 5 wt % may have a compositional variation of less than or equal to about 25%.

In some embodiments, the dispersing $LiAlH_4$ and the catalytic metal additive $MA_z$ may include shaking the $LiAlH_4$ and the catalytic metal additive $MA_z$ in the presence of a mixing aid, the mixing aid including one selected from balls, pellets, blades, rods, or a combination thereof, and having an average kinetic energy on shaking that is lower than an activation energy of the stoichiometric reaction between the LiAlH$_4$ and the catalytic metal additive MA$_z$ to produce a lithium compound LiA.

BRIEF DESCRIPTION OF THE DRAWINGS

The features and advantages of embodiments of the present disclosure will be better understood by reference to the following detailed description when considered in conjunction with the accompanying drawings.

DETAILED DESCRIPTION

Figure 1:
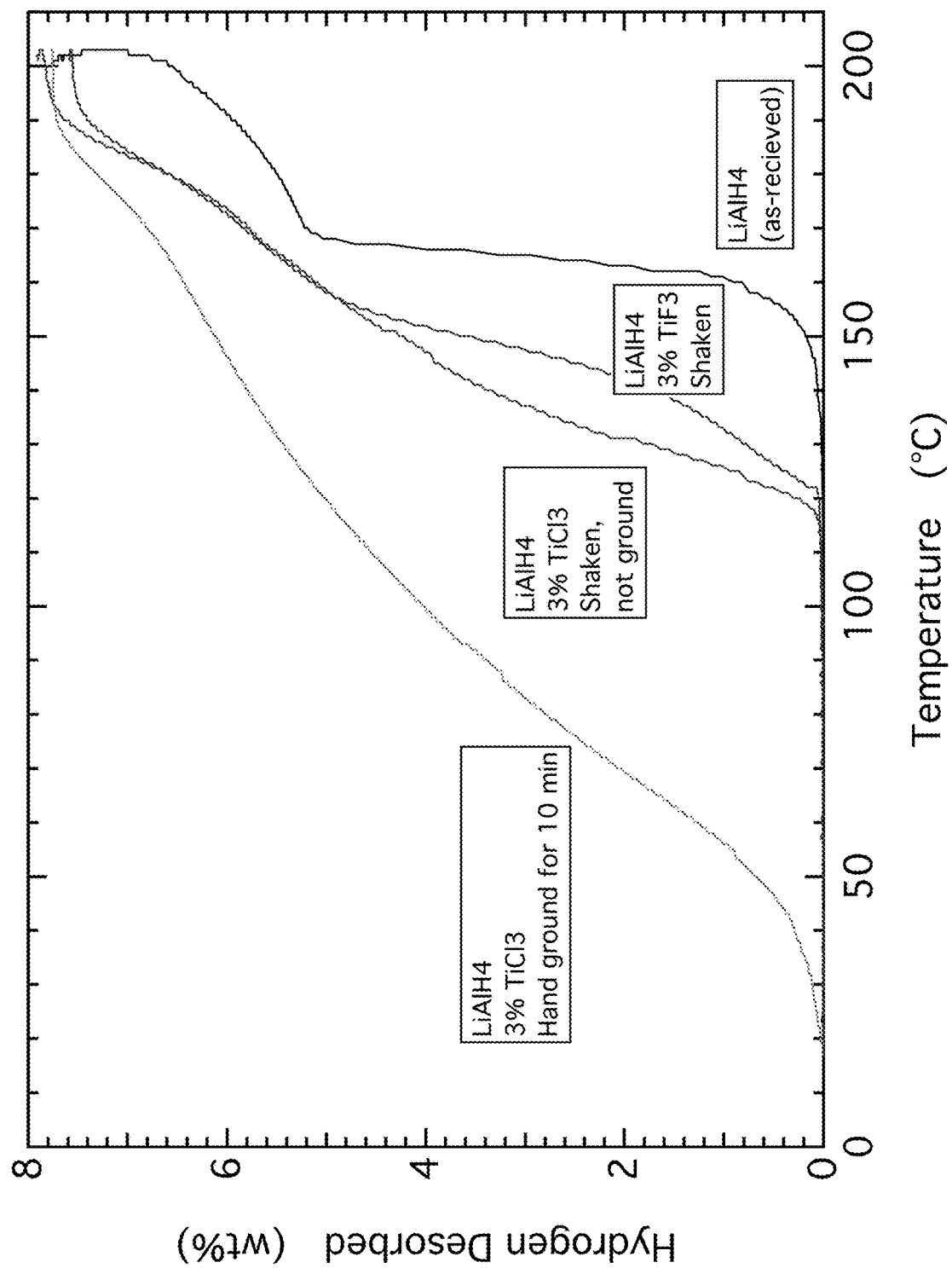
FIG. 1 is a plot of the amount of desorbed hydrogen (in wt %) as a function of temperature under a linearly ramped applied temperature for the hydrogen storage compositions according to Examples 1 to 4.

The following description is provided to enable one of ordinary skill in the art to make and use embodiments of the present disclosure and to incorporate such embodiments in the context of particular applications. Various modifications, as well as a variety of uses in different applications will be readily apparent to those skilled in the art, and the general principles defined herein may be applied to a wide range of embodiments. Thus, the present disclosure is not intended to be limited to the embodiments presented, but is to be accorded the widest scope consistent with the aspects, principles, and novel features disclosed herein.

In the detailed description that follows, numerous specific details are set forth in order to provide a more thorough understanding of some of the embodiments of the present disclosure. However, it will be apparent to those skilled in the art that the present disclosure may be practiced without necessarily being limited to these specific details. In other instances, well-known structures and devices may be shown in block diagram form, rather than in detail, in order to avoid obscuring aspects of the present disclosure.

The reader's attention is directed to all papers and documents that are filed concurrently with this specification and that are open to public inspection with this specification, and the contents of all such papers and documents are incorporated herein by reference. All the features disclosed in this specification (including any accompanying claims, abstract, and drawings) may be replaced by comparable features serving the same, equivalent, or similar purpose, unless expressly stated otherwise. Thus, unless expressly stated otherwise, each feature disclosed is only one example of a generic series of equivalent or similar features. Similarly, unless indicated to the contrary, features of one embodiment may be incorporated into other embodiments without departing from the spirit and scope of the present disclosure.

Furthermore, any element in a claim that does not explicitly state "means for" performing a specified function, or "step for" performing a specific function, is not to be interpreted as a "means" or "step" clause as specified in 35 U.S.C. § 112(f). In particular, the use of "step of" or "act of" in the claims herein is not intended to invoke the provisions of 35 U.S.C. § 112(f).

Example embodiments of the present disclosure will now be described with reference to the accompanying drawings. In the drawings, the same or similar reference numerals refer to the same or similar elements throughout. Herein, the use of the term "may," when describing embodiments of the present disclosure, refers to "one or more embodiments of the present disclosure." In addition, the use of alternative language, such as "or", when describing embodiments of the present disclosure, refers to "one or more embodiments of the present disclosure" for each corresponding item listed.

Throughout this specification, the term "hydrogen" may be used to refer to hydrogen (H) as an atomic element (for example, when describing the stoichiometry of a species, composition or compound), as well as hydrogen in its diatomic standard state (H$_2$). Those having ordinary skill in the art are capable of determining the intended meaning of the term "hydrogen" from its contextual usage. When specifically used with the terms "atom" or "atoms", "hydrogen (H)" refers to atoms of hydrogen. In contrast, the terms "H$_2$" and "hydrogen gas" are interchangeably used to refer only to diatomic hydrogen in its standard state.

Throughout this disclosure, when a process or reaction is described as being represented by, approximated by, generally, and/or substantially similar to a specific chemical equation or equilibrium, the equation and/or equilibrium is presented only to illustrate example embodiments of the present disclosure, and is not meant to limit the embodiment to any particular mechanism or theory, or otherwise limit the scope of embodiments of the present disclosure. For example, the process or reaction may be suitably described by another equation or equilibrium different from that presented herein. Furthermore, additional reactants, reagents, products, and/or other species that are not described in the equation or equilibrium may be present in the reaction or process, and the equation or equilibrium may not necessarily provide a full description of the chemistry involved therein. In addition, it will be understood that the reactions and reagents described herein may be modified or substituted by a person of ordinary skill in the art in various ways. Examples of such modifications that are expressly described herein are included as embodiments of the present disclosure, but are not intended to be limiting.

Aspects of embodiments of the present disclosure are directed to a solid composition for hydrogen storage and generation. Liquid and solid materials that are able to store hydrogen and release it at relatively low temperatures (e.g., below about 200° C.) are of interest as hydrogen carriers for energy devices such as proton exchange membrane fuel cells (PEMFCs). Such hydrogen storage materials would ideally have high volumetric and gravimetric hydrogen densities in order to minimize or reduce the size and weight of the PEMFC system (e.g., the combined fuel cell subsystem and hydrogen storage subsystem). Portable PEMFC technology is of particular interest for a wide range of applications, including fuel cell vehicles, unmanned aerial vehicles, unmanned underwater vehicles, and personal power for military personnel.

Aspects of embodiments of the present disclosure provide for a hydrogen storage composition that includes lithium aluminum hydride (also called lithium alanate, $LiAlH_4$), and a catalytic metal additive (catalyst) designed to tailor the kinetics of hydrogen release. $LiAlH_4$ is a metastable hydride compound and a promising hydrogen carrier (e.g., storage material) because it has a relatively high hydrogen capacity compared to other hydrogen-carrying materials. For example, $LiAlH_4$ has a theoretical (e.g., maximum) gravimetric hydrogen capacity of 7.9 weight percent hydrogen (wt % H atoms with respect to 100 wt % of $LiAlH_4$) when releasing hydrogen according to the overall reaction in Equation 1. This theoretical hydrogen capacity corresponds to generation of 1.5 mol $H_2$/mol $LiAlH_4$. In addition, this hydrogen releasing reaction occurs at a temperature below about 200° C.:

$$LiAlH_4 \rightarrow LiH + Al + 3/2H_2. \quad \text{Equation 1}$$

According to Equation 1, three hydrogen atoms are released ($3/2H_2 \cdot 2H/H_2 = 3H$) for every molecule of $LiAlH_4$, and the wt % of released hydrogen is given by $3/37.95 \cdot 100\%$ (=7.9%), where the gram equivalent mass of the hydrogen atom is assumed to be 1 and the molecular weight of $LiAlH_4$ is 37.95. In a practical sample of $LiAlH_4$ having a purity (P), where a value of P=1 correlates to an ideal pure substance, the wt % hydrogen may be given by $P \cdot 3/37.95 \cdot 100\%$.

However, practical hydrogen release from $LiAlH_4$ is complicated by the fact that the overall reaction in Equation 1 proceeds via two discrete reaction steps, as described by Equations 2 and 3. These two reaction steps have different kinetics (e.g., different reaction rates and energy barriers), which may complicate the process of controllably generating $H_2$ from $LiAlH_4$ (for example, when a constant hydrogen flow is desired in order to produce constant electrical power):

$$LiAlH_4 \rightarrow 1/3Li_3AlH_6 + 2/3Al + H_2, \quad \text{Equation 2}$$

$$1/3Li_3AlH_6 \rightarrow LiH + 1/3Al + 1/2H_2. \quad \text{Equation 3}$$

Furthermore, although $H_2$ release from $LiAlH_4$ occurs below 200° C., it is often desirable to tailor hydrogen release to begin at lower temperatures (for example, to begin at about 140° C. or 120° C.). To address these kinetic issues, hydrogen storage compositions that are based on $LiAlH_4$ often additionally include catalytic metal additives (catalysts) for the reactions represented by Equations 2 and 3. The catalysts may make the two reaction steps (kinetically) more uniform, thereby simplifying controlled release. For example, the energy of the reaction barrier for the second step may be modified so that the difference in $H_2$ release onset temperatures for the first and second steps is small enough to permit continuous $H_2$ release under a temperature ramp. For example, the reaction barrier may be modified so that there is no or a minimal temperature range over which $H_2$ has been completely released by the first step, but is not available for release by the second step, which would result in a decreased $H_2$ release rate over that intermediate range. As used herein, the term "$H_2$ release onset temperature" refers to the minimum temperature at which the composition begins to release $H_2$, and may refer to the minimum temperature for $H_2$ release of a reaction step when used to specifically describe either the "first reaction step" or "second reaction step". Further, the catalysts may permit tailoring (lowering) of the hydrogen release temperature.

Given the solid states of the hydrogen storage composition and the catalyst, the catalyst must be physically well dispersed throughout the $LiAlH_4$ to achieve the above effects. This has been accomplished in the related art by applying high energy milling techniques (e.g., high speed mechanical milling) to ensure complete dispersal. As used herein, the terms "high energy milling" and "high energy mechanical milling" are interchangeably used in their art-recognized sense to refer to mixing techniques that are capable of breaking particles down to the nanometer scale, often with the goal of increasing the reactive surface area of the material. For example, one commercially used milling technique (ball milling) uses heavy metal or ceramic balls with an average diameter of about 0.5 cm in a large amount relative to the material to be milled (for example, at least 1:1 by volume, or up to 200:1 by volume) so that the probability of a particle-ball encounter is relatively high. The balls and material are rotated at speeds of, for example, about 400 rpm, so that the material is broken down by colliding with the balls. Such techniques are commonly used to prepare fused materials such as metal alloys, and the milled particles are often presumed to chemically interact during milling.

Indeed, such milling has been found to negatively impact the preparation and use of hydrogen storage compositions in the related art by causing one or more chemical reactions between the catalytic metal additive and the $LiAlH_4$ during the milling. Such chemical interactions (side reactions) result in premature release of hydrogen, and therefore yield $LiAlH_4$ compositions with reduced hydrogen capacity. The loss of hydrogen is often greater than 7-20% of the initial hydrogen capacity, and in some cases, can be as high as 80% (with respect to the initial hydrogen capacity).

In addition, the unwanted chemical reactions that occur during milling also result in formation of lithium compound byproducts, such as combinations of lithium (from the $LiAlH_4$) with anionic species from the catalyst. These byproducts cannot be hydrogenated to reclaim capacity, and as such, the theoretical hydrogen capacity of the composition is permanently reduced. Non-limiting examples of such compounds include LiCl from the catalytic additive $TiCl_3$, LiF from the catalytic additive $TiF_3$, and $Li_2O$ from the catalytic additive $TiO_x$. The presence of these compounds in a $LiAlH_4$ composition for hydrogen generation are telltale signs of unwanted hydrogen release reactions occurring during milling or mixing of $LiAlH_4$ with the catalytic additive. As an illustrative example, Equation 4 describes the formation of LiCl from a $TiCl_3$ catalyst:

$$TiCl_3 + 3LiAlH_4 \rightarrow 3LiCl + TiAl_3 + 6H_2. \quad \text{Equation 4}$$

The reaction in Equation 4 can be generalized to account for inclusion of the $TiCl_3$ catalyst in a sub-stoichiometric amount with respect to $LiAlH_4$. For a composition including x mole fraction $TiCl_3$ with respect to $LiAlH_4$ (e.g., x mol $TiCl_3$/mol $LiAlH_4$, or $x \cdot 100$ mol % $TiCl_3$), where x is a variable, the reaction can be described by Equation 5:

$$xTiCl_3 + LiAlH_4 \rightarrow 3xLiCl + xTiAl_3 + 6xH_2 + (1-3x)LiAlH_4. \quad \text{Equation 5}$$

As an example, a composition including 3 mol % $TiCl_3$ (x=0.03) could form up to 9 mol % (0.09 mol) LiCl and release 0.18 mol of $H_2$ if the stoichiometric reaction between $LiAlH_4$ and the catalytic additive $TiCl_3$ were to proceed to completion during mixing (with $TiCl_3$ being the limiting reagent). The loss of 0.18 moles of $H_2$ corresponds to a loss of 12% (0.18 out of 1.5 moles) of the initially available hydrogen.

The reaction in Equation 5 can be further generalized from $TiCl_3$ to any catalytic additive $MA_3$, where M is a 3+ valence metal and A is a univalent −1 anion, as shown in Equation 6:

$$x\text{MA}_3+\text{LiAlH}_4 \rightarrow 3x\text{LiA}+x(\text{MAI}_3)+6x\text{H}_2+(1-3x)\text{Li-AlH}_4. \quad \text{Equation 6}$$

In Equation 6, LiA represents the lithium compound byproduct and (MAI$_3$) refers to the overall (average) composition of metal-aluminum alloys or bimetallic clusters, which may be present as a mixture of phases.

The reaction in Equation 6 can be further generalized to a catalytic additive MA$_T$, where M is a z+ valence metal, as shown in Equation 7. In Equation 7, (MAI$_z$) refers to the overall (average) composition of metal-aluminum alloys or bimetallic clusters, which may be present as a mixture of phases. It will be understood that embodiments of the present disclosure are not limited thereto, and the equation may be further generalized to anions with larger negative valences:

$$x\text{MA}_z+\text{LiAlH}_4 \rightarrow (z \cdot x)\text{LiA}+x(\text{MAI}_z)+(z \cdot 2x)\text{H}_2+(1-z \cdot x)\text{LiAlH}_4. \quad \text{Equation 7}$$

In each of Equations 4-7, the chemical reaction may proceed to varying extents. The extent of reaction may be described by a reaction coefficient ξ, where ξ can vary from 0 (no reaction) to 1 (complete reaction). Thus, after formulation (mixing), the LiAlH$_4$ composition may include a lithium compound byproduct in an amount of ξ·z·x mole fraction and LiAlH$_4$ in an amount of (1−ξ·z·x) mole fraction. Equivalently, the composition may have lost ξ·z·2x moles of H$_2$ during this stoichiometric reaction, for a loss of ξ·z·2x/1.5·100% of the theoretically available H$_2$.

Furthermore, additional H$_2$ may be released from the composition via one or more unwanted catalytic reactions that may occur when the mechanical energy input from milling is enough to overcome the lowered kinetic barrier. For example, H$_2$ loss may be catalyzed by the catalytic additive Mk prior to its complete decomposition, and/or may be catalyzed by an intermediate decomposition product, such as a metal-aluminum alloy or cluster. As such, the loss of ξ·z·2x/1.5·100% H$_2$ may represent a lower bound for hydrogen loss in milled LiAlH$_4$ compositions in the related art.

The total unwanted loss of hydrogen can also be expressed in terms of a final or working hydrogen capacity) (wt % H$_2$). This capacity loss may be expressed compared to 1) the original mass of LiAlH$_4$; or 2) the total mass of the composition.

In the first case (original mass of LiAlH$_4$), the hydrogen capacity may be calculated according to Equation 8, where the purity (P) of the composition has been included:

$$\text{wt \% H}_2=P \cdot (1-\xi \cdot z \cdot x) \cdot 3/37.95 \cdot 100\%. \quad \text{Equation 8}$$

In the second case (total mass of the composition), the hydrogen capacity may be calculated according to Equation 9, where MW is the molecular weight of the catalytic additive:

$$\text{wt \% H}_2=P \cdot (1-\xi \cdot z \cdot x) \cdot 3/(37.95+x \cdot \text{MW}) \cdot 100\%. \quad \text{Equation 9}$$

The unwanted loss of hydrogen capacity described in Equations 4 to 9 has limited the usability of LiAlH$_4$ compositions in the related art for hydrogen storage. However, this limitation was thought to be an unavoidable consequence of the need for thorough milling, and was thus tolerated as a necessary loss.

An insight of the LiAlH$_4$ compositions for hydrogen generation described in embodiments of the present disclosure is that physical dispersal of a catalytic additive in LiAlH$_4$ without significant chemical interaction between the additive and the LiAlH$_4$ would enable tailoring of the hydrogen release temperature and improve the kinetic uniformity of the two reaction steps for hydrogen release from LiAlH$_4$ (Equations 2 and 3), without the detrimental loss of hydrogen capacity. Accordingly, one or more embodiments of the present disclosure provide a composition for hydrogen storage and generation that does not suffer from a reduced hydrogen capacity, as caused by chemical interaction between the catalyst and the LiAlH$_4$ during mixing. For example, in LiAlH$_4$-containing compositions for hydrogen storage and generation according to embodiments of the present disclosure, the operative reaction in Equation 7 proceeds to ξ<~0.5. For a catalytic additive MA$_3$ at a concentration of 3 mol % (x=0.03), this yields a composition including less than about 3 mol % lithium compound byproducts and a maximum hydrogen loss of less than about 0.09 moles. This loss is equivalent to a maximum of 6% of the initially available hydrogen, and can be selected to be much lower.

Accordingly, embodiments of the present disclosure are directed toward a composition for hydrogen storage and generation including LiAlH$_4$ and a catalytic metal additive, where the composition is gently mixed in order to physically disperse the LiAlH$_4$ and catalyst powders without causing a chemical interaction (e.g., between the LiAlH$_4$ and the catalytic metal additive). Here, the term "gently mixed" indicates and is the result of the lack or low degree of chemical interaction, as defined below. The hydrogen capacity of the composition is substantially not reduced or decreased (e.g., the composition exhibits less than about 5% reduction in hydrogen capacity) during or as a result of the mixing process. Concomitant with the limited hydrogen capacity loss, the composition does not include, or includes only a limited amount of byproducts caused by the chemical interaction.

In some embodiments, gentle mixing of LiAlH$_4$ and catalytic metal additives can be accomplished without the use of additional media. The term "without the use of additional media" as used herein refers to mixing unaided by balls, pellets, rods, and other devices that are placed in the same vessel as the composition as mixing aids to improve dispersion of the mixture components. The devices are separated from the composition for hydrogen gas storage and generation after use, and are not considered to be part of the composition. However, embodiments of the present disclosure are not limited thereto, and in some embodiments, gentle mixing of LiAlH$_4$ and catalytic metal additives can be accomplished by mixing the composition using lightweight media or mixing aids, as described in more detail below.

According to one or more embodiments of the present disclosure, a composition for hydrogen storage and generation includes: lithium aluminum hydride (LAIN and a catalytic metal additive MA$_z$ that is evenly physically dispersed in the LiAlH$_4$, where M is a z+ valent metal and A is a univalent anion. The composition may further include a lithium compound LiA from a stoichiometric chemical reaction of the catalytic metal additive MA$_z$ with the LiAlH$_4$ (e.g., as a byproduct). The catalytic metal additive MA$_z$ may be included in a mole fraction amount (x) of less than about 0.1 (e.g., x≤0.1). The lithium compound LiA may be included in an amount of less than 0.5·z·x mole fraction.

As used herein, the term "evenly physically dispersed" may refer to a state in which the concentration of MA$_z$ in LiAlH$_4$ is constant throughout the composition, and does not include any particle concentration gradients in any region or direction. For example, samples (fractional amounts including about 0.1 wt % to about 5 wt % of the entire composition) taken from different parts of the composition may have substantially the same concentration of MA$_z$ (e.g., the same proportional amounts of LiAlH$_4$ and MA$_z$), for example, with a variation of less than or equal to about 25%, less than or equal to 1 about 5%, or less than or equal to about 10%, as determined by any suitable analytical technique. Here, "variation" refers to the standard deviation divided by the mean (average) concentration of the samples with respect to a particular element or phase, multiplied by 100%. For example, samples collected at random from various portions of the LiAlH$_4$-containing composition and having a mass of about 10 mg to about 1 g would show less than or equal to about 25% compositional variation, less than about 15% compositional variation, or in some embodiments, less than about 10% compositional variation between samples, with respect to all elements or phases present in the composition. Non-limiting examples of suitable analytical techniques for determining the composition of the samples include elemental analysis techniques (such as energy dispersive X-ray spectroscopy (EDX), X-ray fluorescence (XRF), inductively coupled plasma atomic emission spectroscopy (ICP-AES) or mass spectrometry (ICP-MS), and/or titration), and phase analysis techniques (such as solid state nuclear magnetic resonance (ssNMR) and/or X-ray diffraction (XRD)). The composition should attain the above-described dispersion characteristics while simultaneously maintaining the mole fraction limit of lithium compound LiA described above.

The amount of LiAlH$_4$, which provides the basis for the amounts of all other components, is not particularly limited and may be selected according to the desired theoretical capacity of stored hydrogen and/or the intended application. For example, the LiAlH$_4$ may be included in the composition on the scale of several grams (e.g., about 1 g to about 10 g, about 10 g to about 100 g, about 100 g to about 300 g, or about 200 g to about 500 g, etc.), as well as on the scale of kilograms (e.g., about 0.7 kg to about 5 kg, about 2 kg to about 10 kg, about 10 kg to about 50 kg, about 50 kg to about 100 kg, etc.)

The LiAlH$_4$ may be provided in any suitable solid format that is conducive to being thoroughly mixed with the catalytic metal additive. In some embodiments, for example, the LiAlH$_4$ does not include large clumps, crystals, or pellets with large interior volumes (e.g., on the macroscopic scale) that cannot be easily exposed to particles of the catalytic metal additive. In some embodiments, the LiAlH$_4$ may be provided as a powder.

The particle size of the LiAlH$_4$ (for example, the LiAlH$_4$ powder) is not particularly limited, and for example, the LiAlH$_4$ may have an average particle size of about 1 micron to about 100 microns, or about 10 microns to about 50 microns. The particle size distribution of the powder is also not particularly limited. For example, the powder may have one average particle diameter (e.g., a monomodal particle size distribution), or it may have two or more different average particle diameters (e.g., a bimodal or multimodal distribution).

The catalytic metal additive MA$_z$ may be any compound that is able to suitably catalyze the reactions described in Equations 2 and 3, e.g., so that the reactions occur at a temperature at or below about 140° C., or in some embodiments, at or below about 120° C., and/or with increased or improved kinetic uniformity. In some embodiments, the catalytic metal additive MA$_z$ may be a metal halide salt, for example, A=F, Cl, Br, I. In some embodiments, M may be a transition metal (such as scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanum (La), hafnium (Hf), tantalum (Ta), tungsten (W), rhenium (Re), osmium (Os), iridium (Ir), platinum (Pt), silver (Ag), etc.) or a main group metal (such as aluminum (Al), gallium (Ga), germanium (Ge), indium (In), tin (Sn), etc.). In some embodiments, the catalytic metal additive Mk may include TiCl$_3$, TiCl$_4$, TiF$_3$, NbF$_5$, VCl$_3$, AlCl$_3$, FeCl$_3$, LaCl$_3$, ZrCl$_4$, HfCl$_4$, and/or VBr$_3$. In some embodiments, the catalytic metal additive MA$_z$ may be TiCl$_3$ and/or TiF$_3$.

In some embodiments, the catalytic metal additive MA$_z$ may be included in a mole fraction amount of about $0.005 \leq x \leq 0.1$, for example, about $0.01 \leq x \leq 0.1$, or about $0.02 \leq x \leq 0.8$. In some embodiments, the catalytic metal additive MA$_z$ may be included in a mole fraction amount of about $0.02 \leq x \leq 0.6$, about $0.03 \leq x \leq 0.05$, or about 0.03.

The catalytic metal additive MA$_z$ may be provided in any suitable format that is conducive to being thoroughly mixed with the LiAlH$_4$. In some embodiments, the catalytic metal additive Mk may be provided as a solid. For example, the catalytic metal additive MA$_z$ may have a similar average particle size and particle size distribution as described with respect to the LiAlH$_4$. In some embodiments, the catalytic metal additive MA$_z$ may be provided as a liquid, so that droplets or particles of the liquid are dispersed throughout the solid LiAlH$_4$.

As discussed above, when the catalytic metal additive MA$_z$ stoichiometrically reacts with the LiAlH$_4$ during mixing, a lithium compound byproduct is produced. The composition of the lithium compound LiA may be determined by the composition of the catalytic metal additive MA$_T$. In some embodiments, for example, the catalytic metal additive MA$_z$ may be or include a metal chloride, fluoride, bromide, and/or iodide, and the lithium compound LiA may be LiCl, LiF, LiBr, and/or LiI, respectively. In some embodiments, the catalytic metal additive MA$_z$ may be or include a metal chloride or metal fluoride, and the lithium compound LiA may be LiCl and/or LiF.

The amount of lithium compound LiA is dependent on the extent of the unwanted stoichiometric reaction between the catalytic metal additive MA$_z$ and the LiAlH$_4$.

In some embodiments, the lithium compound byproduct LiA may be included in an amount less than about $0.4 \cdot z \cdot x$ mole fraction (e.g., $\xi = 0.4$), for example, less than about $0.3 \cdot z \cdot x$ ($= 0.3$), or less than about $0.2 \cdot z \cdot x$ ($= 0.2$), where z is derived from the composition of the catalytic metal additive MA$_T$, and x is determined by the amount of catalyst.

The amount of lithium compound LiA can be correlated to the amount of hydrogen capacity loss using the stoichiometric relations in Equation 7. For example, when the lithium compound LiA is produced in an amount of $\xi \cdot z \cdot x$ mole fraction, the composition has at least a corresponding hydrogen (H$_2$) loss of $\xi \cdot z \cdot 2x$ mole fraction. The theoretical LiAlH$_4$ hydrogen capacity is 7.9 g H (atoms)/100 g LiAlH$_4$, which, at a LiAlH$_4$ molecular weight of 37.95 g/mol, corresponds to a mole fraction of 1.5 moles H$_2$ (gas)/mol LiAlH$_4$. Accordingly, at ($\xi = 0.5$) for the reaction of a catalytic metal additive MA$_z$ with z=3 and x=0.03, (0.5)(3)(2)(0.03)=0.09 mol H$_2$ lost, which corresponds to 0.09/1.5*100%=6% H$_2$ lost. Similarly, the same catalytic metal additive and reaction would result in 4.8% H$_2$ lost at (=0.4), 3.6% H$_2$ lost at (=0.3), and 2.4% H$_2$ lost at (=0.2).

The amount of lithium compound LiA produced as a byproduct of the stoichiometric reaction between the catalytic metal additive MA$_z$ and LiAlH$_4$ can be detected using any suitable method capable of distinguishing between material phases, for example, XRD and/or ssNMR.

In some embodiments, the hydrogen capacity loss can also or instead be monitored by and correlated to the decrease in the amount of one or more reactants (e.g., Mk and/or LiAlH$_4$) by assuming that the decrease in reactants should stoichiometrically mirror any increase in LiA byproduct. This decrease can be detected using any suitable method capable of distinguishing between material phases, for example, XRD and/or ssNMR.

The composition may be characterized in terms of the remaining hydrogen capacity available for release. In some embodiments, the composition may have a hydrogen capacity of greater than or equal to about 6.4 wt %, greater than or equal to about 6.5 wt %, greater than or equal to about 6.6 wt %, greater than or equal to about 6.7 wt %, greater than or equal to about 6.8 wt %, greater than or equal to about 6.9 wt %, greater than or equal to about 7.0 wt %, greater than or equal to about 7.1 wt %, greater than or equal to about 7.2 wt %, greater than or equal to about 7.3 wt %, greater than or equal to about 7.4 wt %, greater than or equal to about 7.5 wt %, greater than or equal to about 7.6 wt %, greater than or equal to about 7.7 wt %, or greater than or equal to about 7.8 wt % with respect to the original amount of LiAlH$_4$.

In some embodiments, the composition may have the above hydrogen capacity while simultaneously having an H$_2$ release onset temperature of about 90° C. to about 140° C., for example, about 100° C. to about 130° C., or about 110° C. to about 120° C. For example, the composition may retain its hydrogen capacity to a higher degree, compared to compositions in the related art, while having an H$_2$ release onset temperature that is suitably high enough to prevent or reduce inadvertent release at room and/or storage temperatures, while suitably decreased compared to uncatalyzed LiAlH$_4$.

According to one or more embodiments of the present disclosure, a hydrogen storage device includes the composition for hydrogen storage and generation including lithium aluminum hydride (LiAlH$_4$) and MA$_z$ as described above. The prepared hydrogen storage composition may be incorporated into the hydrogen storage device having any suitable format, for example, in a format compatible with a PEMFC hydrogen storage subsystem, as understood and carried out by those having ordinary skill in the art.

According to one or more embodiments of the present disclosure, a method of preparing a composition for hydrogen storage and generation includes dispersing a catalytic metal additive MA$_z$ in LiAlH$_4$ so that the catalytic metal additive MA$_z$ is evenly physically dispersed in the LiAlH$_4$, where M is a z+ valent metal and A is a univalent anion, wherein a stoichiometric reaction between the LiAlH$_4$ and the catalytic metal additive MA$_z$ proceeds to less than about 50% of completion (e.g., $\xi$=0.5), and the catalytic metal additive MA$_z$ is included in an amount of x mole fraction of LiAlH$_4$, x being less than about 0.1. In some embodiments, the reaction between the LiAlH$_4$ and the catalytic metal additive MA$_z$ may proceed to less than about 40% of completion (e.g., $\xi$=0.4), less than about 30% of completion (e.g., $\xi$=0.3), or less than about 20% of completion (e.g., $\xi$=0.2). The term "evenly physically dispersed" may be the same as described above, and may be ascertained using the same elemental and phase concentration methods as described above. Further, the composition prepared according to embodiments of the present disclosure may have the same chemical composition and properties as described above.

In some embodiments, gentle mixing of LiAlH$_4$ and catalytic metal additives can be accomplished without the use of additional media. The term "without the use of additional media" as used herein refers to mixing unaided by balls, pellets, blades, rods, and other devices that are placed in the same vessel as the composition as mixing aids to facilitate random displacement and dispersion of the mixture components. The devices are separated from the composition for hydrogen gas storage and generation after use, and are not considered to be part of the composition. In some embodiments of the present disclosure, the LiAlH$_4$ and catalytic metal additive are gently mixed by shaking the powders together without additional media, as described in additional detail below.

In some embodiments, gentle mixing of LiAlH$_4$ and catalytic metal additives can be accomplished in the presence of lightweight media. As used herein, the term "lightweight media" refers to mixing aids such as balls, pellets, blades, rods, and other devices having a relatively light weight (mass) relative to milling aids in the related art so that their kinetic energy on colliding with particles of the composition is insufficient to overcome the activation energies of the reactions described by Equations 4 to 7, and so the composition remains inert (unreactive) during the mixing process. In some embodiments, when the mixing aids include balls or pellets that are repeatedly dropped into particles of the composition, the mixing aids may have a relatively small diameter relative to milling aids in the related art, for example, having an average diameter of less than 0.5 cm, for example, about 0.4 cm to about 0.1 cm. In some embodiments, the mixing aids may be hollow (have an evacuated core portion) to decrease their kinetic energy. Non-limiting examples of suitable materials used to form the lightweight media may include ceramics (such as tungsten carbide, silicon carbide, zirconium oxide, and aluminum oxide), plastic (such as polyethylene, polypropylene, and polycarbonate), glass, rubber, and metal (such as stainless steel). In some embodiments, when the mixing aids include a blade or rod that is inserted into the composition and agitated, translated, and/or rotated to induce particle dispersion, the blade or rod may be positioned to avoid or substantially avoid grinding and shearing of particles against the chamber walls.

When gentle mixing is carried out in the presence of lightweight media, the mixing parameters, including time and velocity (e.g., the speed and/or energy of a mixing movement) should be suitably selected so that the kinetic energy of the media remains insufficient to overcome the activation energies of the reactions described by Equations 4 to 7, and the composition remains inert during mixing, as described above. For example, the degree of mixing the LiAlH$_4$ with the catalytic metal additive Mk should be sufficient to increase the kinetic uniformity of Equations 2 and 3 and enable the hydrogen release temperature to be tailored by sufficiently dispersing the catalytic metal additive in the LiAlH$_4$; but should also give compositions with hydrogen capacities that are less than about 5% reduced from theoretical, and do not include lithium compound byproducts in an amount larger than described above. Those having skill in the art are capable of experimentally determining such suitable mixing parameters by characterizing the degree of dispersion and the extent of reaction during mixing, according to the details provided herein.

In some embodiments, the compositions are produced by mixing LiAlH$_4$ with a catalyst using a "shaking" process. The term "shaking" may refer but is not limited to: 1) placing the powders to be mixed in a closed container (such as a jar, bag, barrel, flask, or chamber) having a volume that is larger than the volume of the powders themselves, 2) sealing the container, and 3) moving the container rapidly back and forth. The direction of movement may be linear, rotational (around a vertically oriented fixed central axis or around an offset axis as in planetary movement), tumbling (e.g., rotating along a horizontally oriented axis) or a combination thereof. The displacement of the powders of $LiAlH_4$ and catalytic additives within the container during the shaking enables gentle mixing (physical dispersal) that limits the extent of unwanted chemical interaction between the powders.

In some embodiments, the shaking may be carried out without additional media. In some embodiments, the shaking may be carried out with lightweight media (e.g., lightweight balls or pellets) as long as the composition attains a suitable degree of dispersion and suitably limited extent of reaction during mixing, as described above.

In some embodiments, the dispersing $LiAlH_4$ and the catalytic metal additive $MA_z$ may include shaking the $LiAlH_4$ and the catalytic metal additive $MA_z$ in the presence of a mixing aid, the mixing aid including one selected from balls, pellets, blades, rods, or a combination thereof, and having an average kinetic energy (KE) on shaking that is lower than an activation energy of the stoichiometric reaction between the $LiAlH_4$ and the catalytic metal additive $MA_z$ to produce a lithium compound LiA. Here, the term "lower", may refer to an energy (for example, as measured or calculated in kcal or kJ) that is numerically about 5% to about 50% lower, for example, about 10% to about 40%, about 15% to about 35%, or about 20% to about 30% lower. For example, the average kinetic energy may be calculated according to the relationship $KE=\frac{1}{2}mv^2$, where m is the mass of the mixing aid and the v is the velocity of the mixing aid during mixing or shaking, the activation energy may be measured or calculated using any suitable technique available in the art, for example, by measuring the rate constant of the reaction(s) at various temperatures and fitting the data to the Arrhenius equation. Such techniques should be understood by those having ordinary skill in the art, and will not be described in detail herein. From a qualitative perspective, when the average kinetic energy (KE) on shaking is lower than an activation energy of the stoichiometric reaction between the $LiAlH_4$ and the catalytic metal additive $MA_z$ to produce a lithium compound LiA, the stoichiometric reaction should not proceed to completion (stoichiometric completion) within the duration of shaking, for example, less than about 50% of completion, less than about 40% of completion (e.g., $\xi=0.4$), less than about 30% of completion (e.g., $\xi=0.3$), or less than about 20% of completion (e.g., $\xi=0.2$).

In some embodiments, when the composition has a powder density of about 0.5 $g/cm^3$, or equivalently a specific powder volume of about 2 $cm^3/g$, the ratio of the container volume to the powder volume may be greater than about 10:1, for example, about 50:1 to about 10:1, or about 30:1 to about 15:1. Some example combinations of the composition mass to container mixing volume include: 1 gram of powder in 60 $cm^3$, 50 grams in 1900 $cm^3$, or 100 grams in 1900 $cm^3$.

In some embodiments, for example when the shaking is carried out using a closed container under linear movement, the shaking may be carried out at a frequency of less than about 10 Hz, for example, about 1-5 Hz or about 1-2 Hz. The shaking may be carried out manually, or may be automated, e.g., by attachment to a moving platform. Further, in some embodiments, the shaking may be carried out without additional media, and in some embodiments, the shaking may be carried out using lightweight media or mixing aids, as discussed above. When the composition is prepared on a scale of about 1 to 10 grams, the shaking time may be about 1 minute to about 10 minutes. However, the shaking times may be longer for larger volumes of the composition, and/or shorter for shaking at higher frequencies. For example, the shaking time for about 50 g of composition may be about 8 minutes to about 15 minutes, or about 10 minutes to about 12 minutes. The mixing time may be selected by those having ordinary skill in the art by monitoring for changes in the hydrogen generation properties of the composition with increased mixing times. Further, as discussed above, the mixing time may be further modified, e.g., to be shorter in the presence of lightweight media or mixing aids, and/or as required to reach the described degree of dispersion while limiting the extent of reaction during mixing.

In some embodiments, the shaking may be carried out using a paint shaker or similar apparatus capable of linear movement in multiple directions, where the speed or energy of mixing is determined by the voltage applied to the shaker. For example, given a maximum voltage of about 90 V, the shaking may be carried out at a voltage of about 20 V (e.g., the minimum voltage) to about 45 V (e.g., half maximum voltage). Further, in some embodiments, the shaking may be carried out without additional media, and in some embodiments, the shaking may be carried out using lightweight media or mixing aids, as discussed above. Again, it will be understood that those having ordinary skill in the art are capable of adjusting the voltage and mixing time of the apparatus as required to reach the described degree of dispersion while limiting the extent of reaction during mixing.

In some embodiments, the shaking may be carried out using a planetary shaker or similar apparatus capable of planetary rotational movement (e.g., rotation around an offset vertical axis), where the speed or energy of mixing is given in rpm. In some embodiments, the shaking may be carried out without additional media, and in some embodiments, the shaking may be carried out using lightweight media, as discussed above. Those having ordinary skill in the art are capable of adjusting the speed and time of mixing as required to reach the described degree of dispersion while limiting the extent of reaction during mixing.

In some embodiments, gentle mixing may be accomplished by manually stirring the composition in an open vessel with a blade or rod, or for example by using a mortar and pestle. Those having ordinary skill in the art are capable of adjusting the applied force and time of mixing as required to reach the described degree of dispersion while limiting the extent of reaction during mixing.

The following examples and data are provided for illustrative purposes only, and do not limit the scope of the embodiments of the present disclosure.

EXAMPLES

Example 1

$LiAlH_4$ powder (Sigma-Aldrich, St. Louise, Mo.) was used as received.

Example 2

3 mol % $TiCl_3$ was added to the $LiAlH_4$ of Example 1 and ground by hand using a mortar and pestle for about 10 minutes.

Example 3

3 mol % $TiCl_3$ was added to the $LiAlH_4$ of Example 1 for a total mass of 1 g. The composition was placed in a 60 $cm^3$ vial and shaken for 1.5 minutes.

Example 4

3 mol % $TiF_3$ was added to the $LiAlH_4$ of Example 1 for a total mass of 1 g. The composition was placed in a 60 $cm^3$ vial and shaken for 1.5 minutes.

Figure 2:
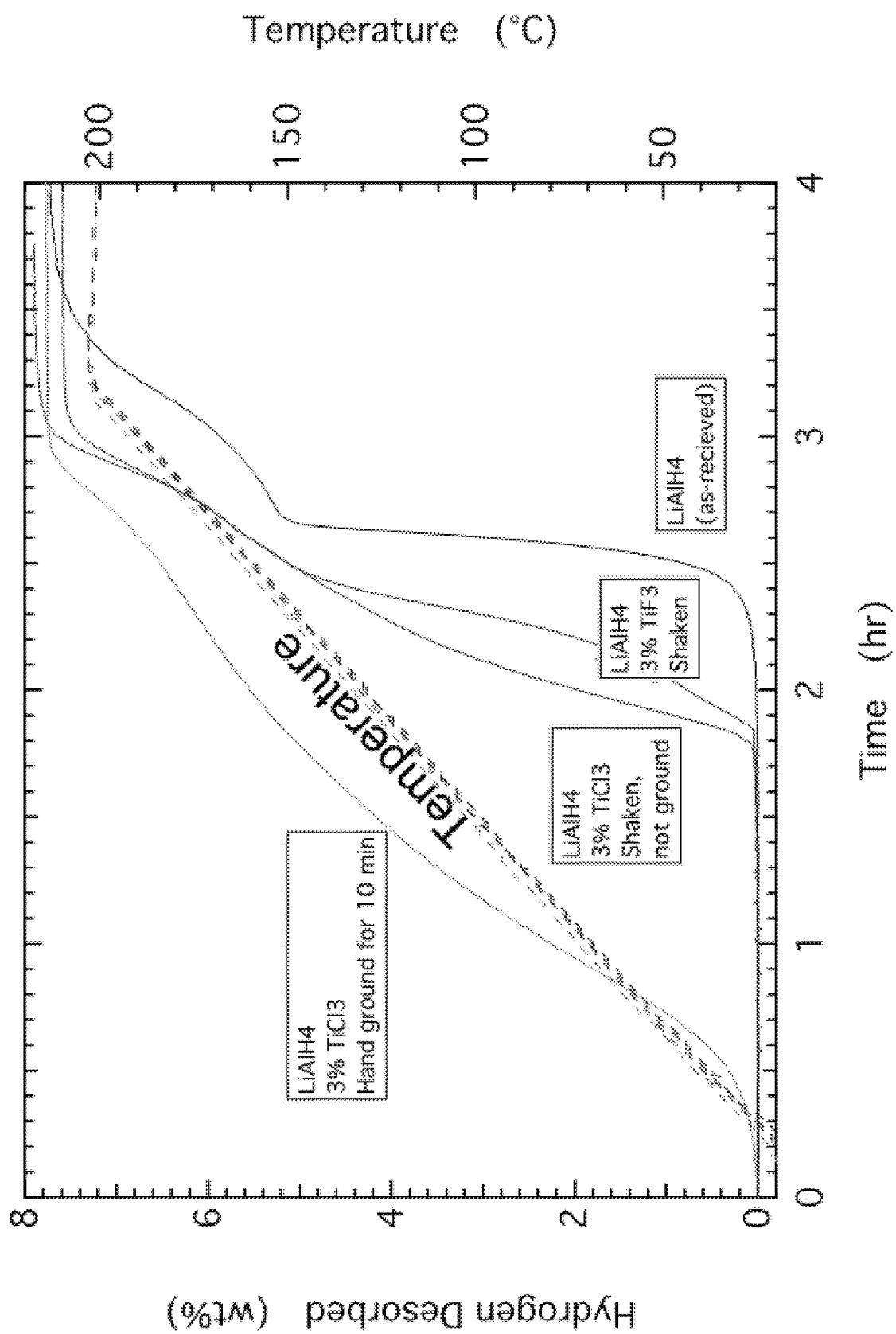
FIG. 2 is a plot of the same data in FIG. 1 as a function of time for the hydrogen storage compositions according to Examples 1 to 4.

The compositions of Examples 1 to 4 were studied by thermal desorption in a volumetric gas measurement (Sievert's) apparatus, which measures the volume of released (desorbed) hydrogen gas with respect to applied temperature. FIGS. 1 and 2 are plots showing the hydrogen release profiles of all four compositions. FIG. 1 is a plot of the amount of desorbed hydrogen (in wt % H) versus (e.g., as a function of) temperature under a linearly ramped applied temperature, where the amount of hydrogen is calculated with respect to the original amount of $LiAlH_4$ (g $H_2$/100 g $LiAlH_4$). FIG. 2 is a plot of the same desorbed hydrogen data versus (e.g., as a function of) time. The dashed lines correspond to the applied temperature, and demonstrate a linearly increasing ramp in all runs.

The $LiAlH_4$ composition of Example 1, which does not include any catalyst metal additive, begins to release hydrogen at about 140° C. The differing kinetics of the two steps described by Equations 2 and 3 can be observed in this sample by the presence of the "knee" at about 170° C. in both plots. For example, the different slopes of the two regions on either side of the knee are due to different hydrogen release rates for the two hydrogen-releasing steps. The amount of desorbed hydrogen was found to be close to the theoretical value of 7.9 wt %. In particular, the amount of hydrogen released during the test was 7.8 wt %, indicating a purity P>0.98.

The 3 mol % $TiCl_3$ $LiAlH_4$ composition of Example 2, which was prepared by hand grinding, exhibits a dramatically reduced hydrogen release temperature, and in fact, begins to release hydrogen at about 20° C. (room temperature). As can be seen more clearly in FIG. 2, hydrogen release in Example 2 begins as soon the sample is heated. The hand-grinding for this sample was relatively gentle, and the amount of desorbed hydrogen was found to be nearly identical with the amount in Example 1. Nevertheless, the release of hydrogen room temperature indicates that some hydrogen was likely released during the hand grinding and/or would be inadvertently released during further processing and storage.

Figure 3:
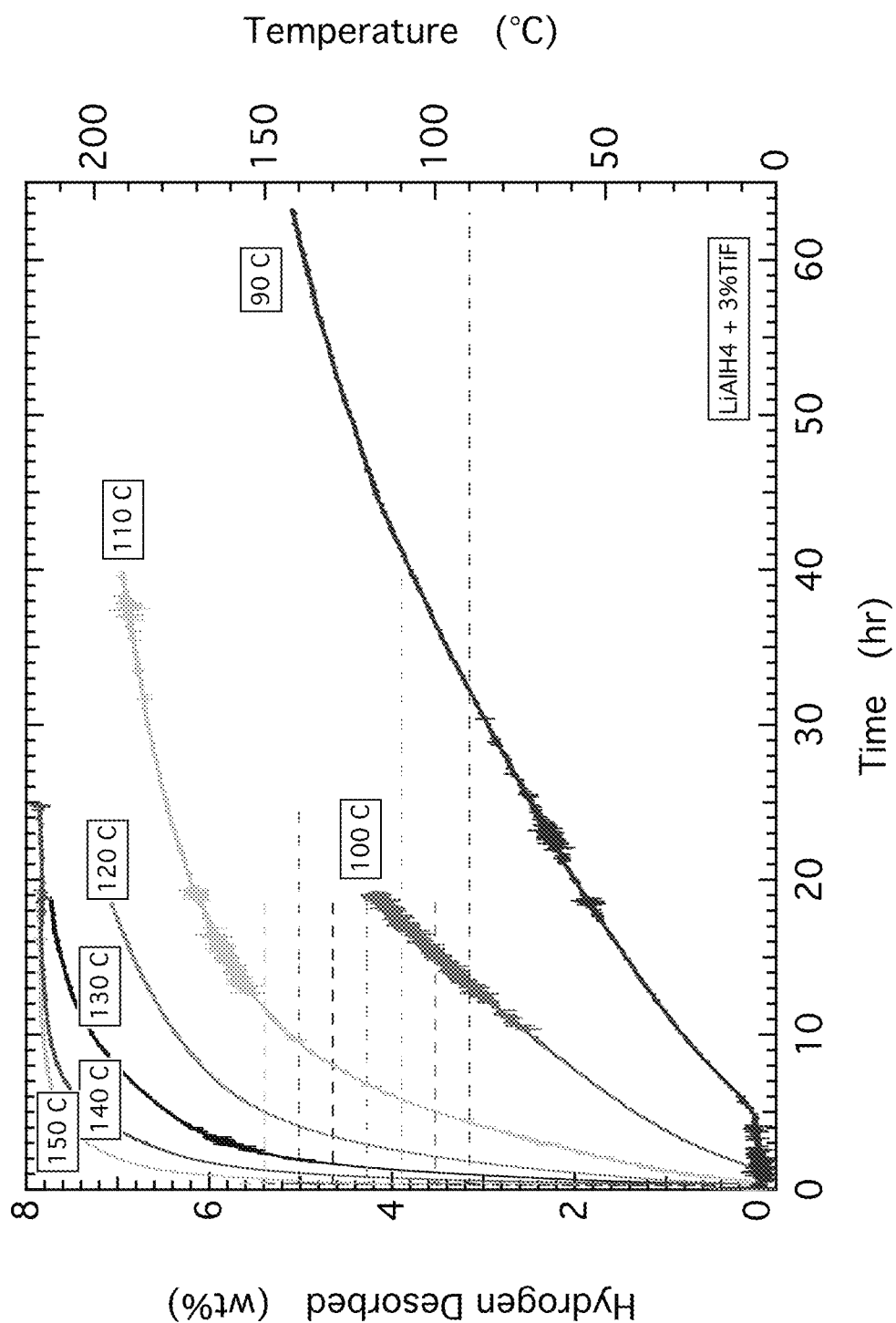
FIG. 3 is a plot showing the hydrogen release kinetics for the composition of Example 4 by plotting the total volume of desorbed hydrogen with respect to time when the sample is held at an isothermal (static) temperature between 90° C. to 150° C.
Figure 4:
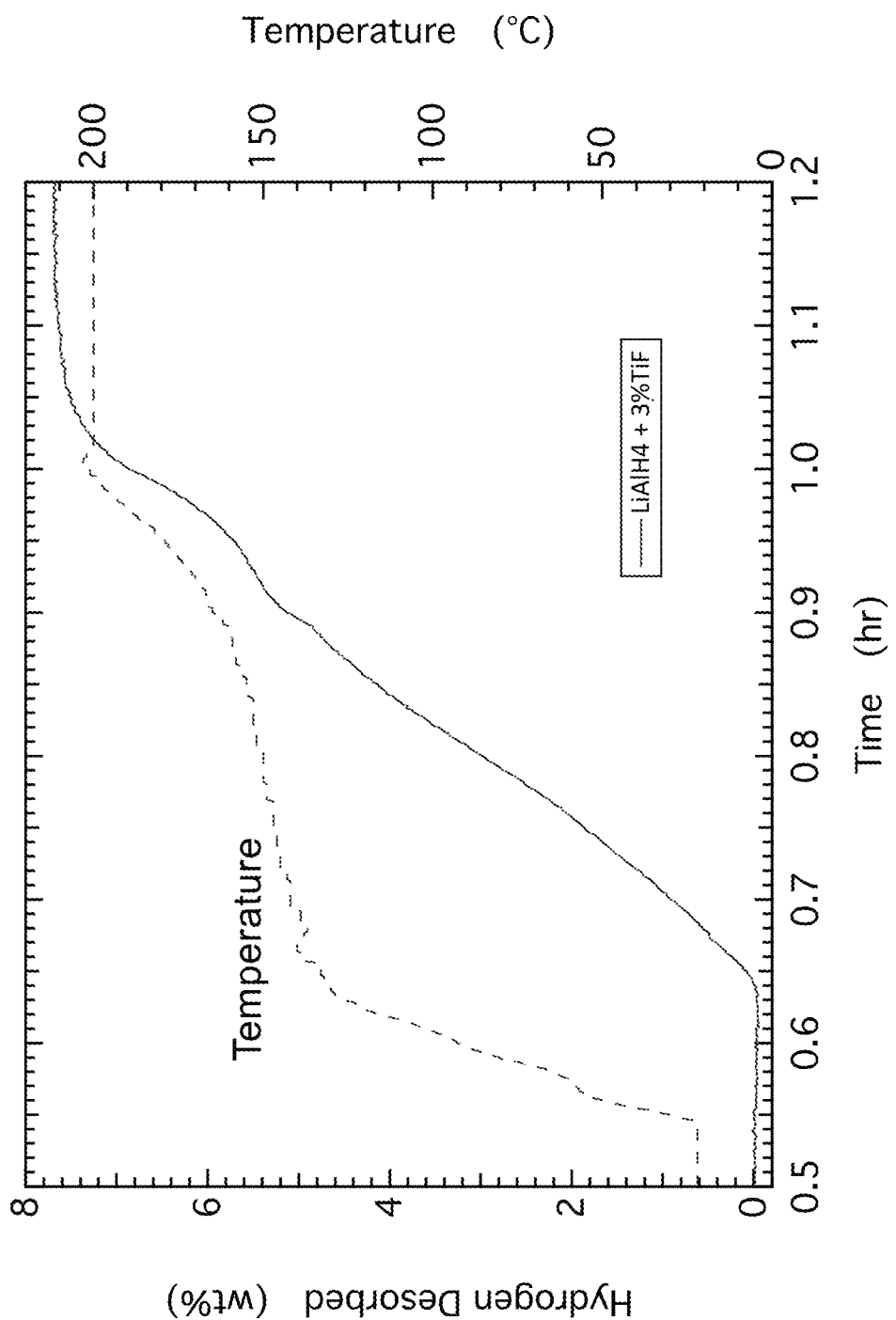
FIG. 4 is a plot showing the results of the kinetic analysis in FIG. 3, which was used to design a controlled temperature profile (dashed trace) to allow the composition of Example 4 to release hydrogen (solid trace) at a constant rate.

The compositions of Examples 3 and 4 both begin to release hydrogen at about 120° C., with substantial kinetic uniformity between the two reaction steps. The <2% H loss of hydrogen capacity in Example 4 (with x=0.03) corresponds to a $LiAlH_4$/catalytic-additive chemical interaction that proceeded to <22% of completion. Thus, each composition released a capacity of >7.6 wt % $H_2$ relative to the original amount of $LiAlH_4$, and a capacity of >7.0 wt % $H_2$ relative to the total mass of the composition, FIG. 3 shows the hydrogen release kinetics for the composition of Example 4 by plotting the total volume of desorbed hydrogen with respect to time when the sample is held at an isothermal (static) temperature between 90° C. to 150° C. The curves for the composition of Example 4 are smooth, with no breaks from the two step hydrogen release. Based on this characterization, a temperature profile program to enable linear hydrogen release was calculated, and the results of applying this program are shown in FIG. 4. In FIG. 4, the temperature (dashed trace) is controlled so that the composition of Example 4 releases hydrogen (solid trace) at a constant rate.

Figure 5:
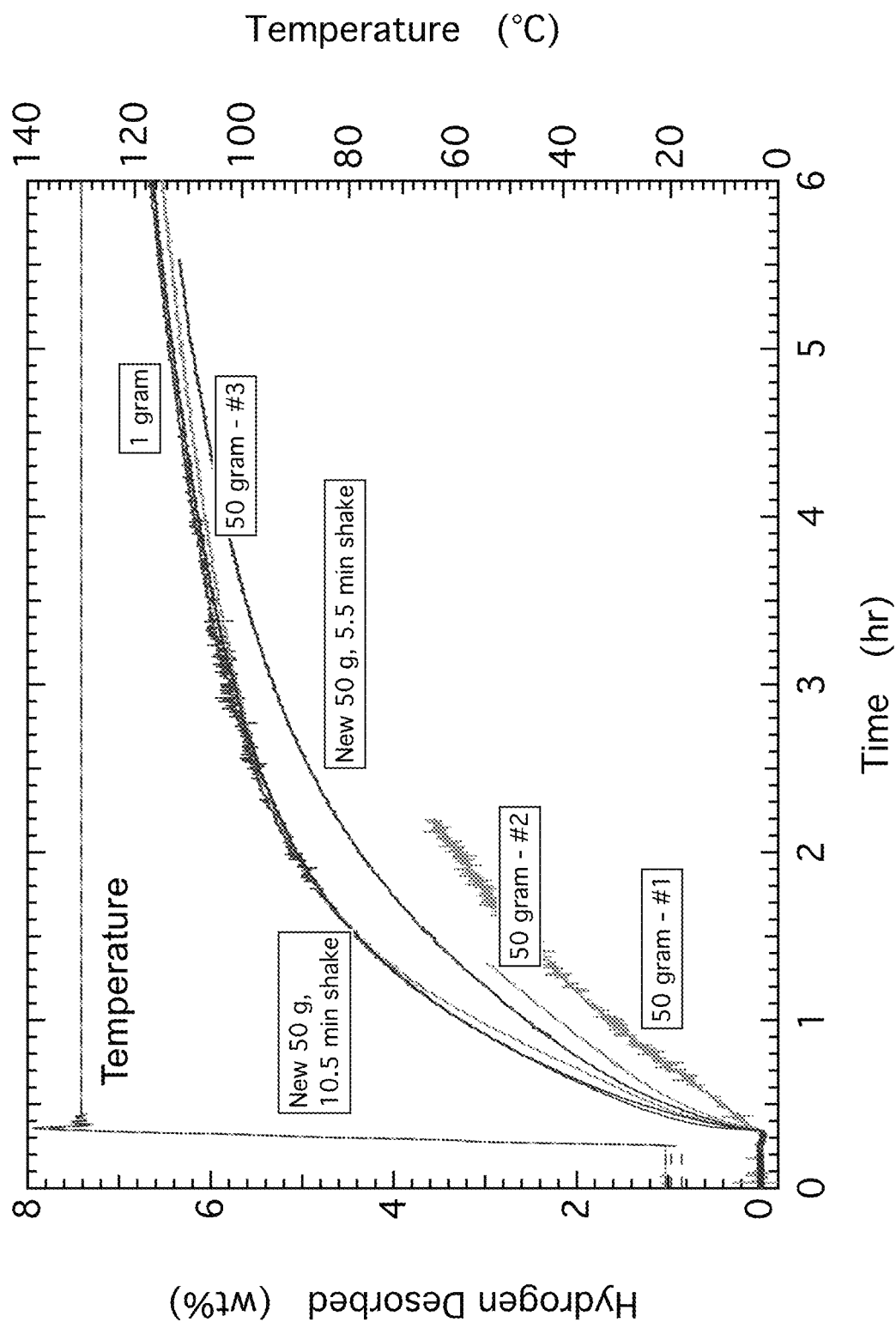
FIG. 5 is a plot showing the effect of mixing time and the reproducibility for two batches of Example 4 scaled to 50 g.

FIG. 5 shows the effect of mixing time and the reproducibility for different batches of Example 4 scaled to different masses. The curve labeled "1 gram" corresponds to isothermal hydrogen release at 130° C. for the 1 g sample tested in FIG. 3. A 50 g batch having the same composition as Example 4 was prepared and tested after each of 3 rounds of shaking in a jar at 2 Hz for about 3 minute each. After the first round of shaking ("50 gram—#1"), the hydrogen release kinetics were found to be much slower than for the 1 gram sample. The kinetics were improved after the second round of shaking ("50 gram—#2"). After the third round ("50 gram—#3"), the kinetics were nearly identical to the 1 gram sample. A second 50 g batch having the same composition as Example 4 was prepared, and exhibited slower kinetics after 5.5 min of shaking ("New 50 g, 5.5 min shake") but nearly identical kinetics after 10.5 min of shaking ("New 50 g, 10.5 min shake").

As used herein, unless otherwise expressly specified, all numbers such as those expressing values, ranges, amounts or percentages may be read as if prefaced by the word "about", even if the term does not expressly appear. As used herein, the terms "substantially", "about", "nearly", and similar terms are used as terms of approximation and not as terms of degree, and are intended to account for the inherent deviations in measured or calculated values that would be recognized by those of ordinary skill in the art. Plural encompasses singular and vice versa. For example, while the present disclosure may describe "an" electrode or "a" substrate, a mixture of such electrodes or substrates can be used. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. As used herein, the terms "combination thereof" and "combinations thereof" may refer to a chemical combination (e.g., an alloy or chemical compound), a mixture, or a laminated structure of components.

It will be understood that although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath", "below", "lower", "under", "above", "upper", and the like, may be used herein for ease of explanation to describe one element or feature's relationship to another element(s) or feature(s) as illustrated in the accompanying drawings. It will be understood that the spatially relative terms are intended to encompass different orientations of the device in use or in operation, in addition to the orientations depicted in the accompanying drawings. For example, if the structures in the accompanying drawings are turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including", when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively.

While the subject matter of the present disclosure has been described in connection with certain embodiments, it is to be understood that the subject matter of the present disclosure is not limited to the disclosed embodiments, but, on the contrary, the present disclosure is intended to cover various modifications and equivalent arrangements included within the spirit and scope of the appended claims, and equivalents thereof.

What is claimed is:

1. A composition for hydrogen storage and $H_2$ generation, the composition comprising: lithium aluminum hydride (LiAlH$_4$); a catalytic metal additive MA$_z$ that is physically dispersed in the LiAlH$_4$, with variation of less than or equal to about 25%, where M is a $z^+$ valent metal and A is a univalent anion; and a lithium compound LiA of a stoichiometric reaction of the catalytic metal additive MA$_z$ with the LiAlH$_4$, in an amount of less than 0.5·z·x mole fraction, wherein the catalytic metal additive MA$_z$ is included in an amount of x mole fraction of LiAlH$_4$, 0.03≤x≤0.1; the composition has a hydrogen capacity of greater than or equal to about 7.1 wt % with respect to the original amount of LiAlH$_4$ at a temperature below 200° C., and wherein the composition is prepared by a method comprising: dispersing the catalytic metal additive MA$_z$ in lithium aluminum hydride (LiAlH$_4$) without any additional medium so that the catalytic metal additive MA$_z$ is physically dispersed in the LiAlH$_4$, with variation of less than or equal to about 25%, and a stoichiometric reaction between the LiAlH$_4$ and the catalytic metal additive MA$_z$ to produce a lithium compound LiA proceeds to less than about 50% of completion, where M is a z+ valent metal and A is a univalent anion, and wherein the catalytic metal additive MA$_z$ is included in an amount of x mole fraction of LiAlH$_4$, 0.03≤x≤0.1.

2. The composition of claim 1, where 0.03≤x≤0.05.

3. The composition of claim 1, wherein the catalytic metal additive MA$_z$ is TiCl$_3$ and/or TiF$_3$.

4. The composition of claim 1, wherein the lithium compound LiA is LiCl and/or LiF.

5. The composition of claim 1, wherein the lithium compound LiA is included in an amount less than 0.3·z·x mole fraction.

6. The composition of claim 1, wherein samples taken from different parts of the composition in an amount of about 0.1 wt % to about 5 wt % have a compositional variation of less than or equal to about 25%.

7. The composition of claim 1, having a hydrogen release onset temperature of about 90° C. to about 140° C.

8. A hydrogen storage device comprising the composition of claim 1.

9. A method of preparing the composition for hydrogen storage and generation according to claim 1, the method comprising:
dispersing the catalytic metal additive MA$_z$ in lithium aluminum hydride (LiAlH$_4$) without any additional medium so that the catalytic metal additive MA$_z$ is physically dispersed in the LiAlH$_4$, with variation of less than or equal to about 25%, and a stoichiometric reaction between the LiAlH$_4$ and the catalytic metal additive MA$_z$ to produce a lithium compound LiA proceeds to less than about 50% of completion, where M is a z+ valent metal and A is a univalent anion, and wherein the catalytic metal additive MA$_z$ is included in an amount of x mole fraction of LiAlH$_4$, 0.03≤x≤0.1.

10. The method of claim 9, wherein the dispersing LiAlH$_4$ and the catalytic metal additive MA$_z$ comprises shaking about 1 to about 10 g of the LiAlH$_4$ and the catalytic metal additive MA$_z$ for about 1 minute to about 10 minutes at a frequency of less than about 10 Hz in a closed container.

11. The method of claim 9, wherein the dispersing LiAlH$_4$ and the catalytic metal additive MA$_z$ comprises shaking up to about 50 g of the LiAlH$_4$ and the catalytic metal additive MA$_z$ for about 8 minutes to about 20 minutes at a frequency of less than about 10 Hz in a closed container without additional media.

12. The method of claim 9, wherein the stoichiometric reaction between the LiAlH$_4$ and the catalytic metal additive MA$_z$ proceeds to less than about 30% of completion.

13. The method of claim 9, where 0.03≤x≤0.05.

14. The method of claim 9, wherein samples taken from different parts of the composition in an amount of about 0.1 wt % to about 5 wt % have a compositional variation of less than or equal to about 25%.

15. The method of claim 9, wherein the dispersing LiAlH$_4$ and the catalytic metal additive MA$_z$ comprises shaking the LiAlH$_4$ and the catalytic metal additive MA$_z$ in the presence of a mixing aid,
the mixing aid comprising one selected from balls, pellets, blades, rods, or a combination thereof, and having an average kinetic energy on shaking that is lower than an activation energy of the stoichiometric reaction between the LiAlH$_4$ and the catalytic metal additive MA$_z$ to produce a lithium compound LiA.

* * * * *